United States Patent [19]

Andelin

[11] Patent Number: 5,019,277
[45] Date of Patent: May 28, 1991

[54] OIL SKIMMING APPARATUS AND METHOD

[76] Inventor: John B. Andelin, RR3, Box 626, Williston, N. Dak. 58801

[21] Appl. No.: 527,141

[22] Filed: May 22, 1990

[51] Int. Cl.⁵ .......................................... E02B 15/04
[52] U.S. Cl. .................... 210/776; 210/242.3; 210/253; 210/923
[58] Field of Search ............. 210/242.3, 776, 923, 210/253, 257.1, 258

[56] References Cited

U.S. PATENT DOCUMENTS

| | | | |
|---|---|---|---|
| 3,664,505 | 5/1972 | Brittingham | 210/923 |
| 3,754,653 | 8/1973 | Verdin | 210/242.3 |
| 3,756,414 | 4/1973 | Crisafulli | 210/923 |
| 3,822,789 | 7/1974 | Crisafulli | 210/923 |
| 3,847,815 | 11/1974 | Chastan-Bagnis | 210/423 |
| 3,951,810 | 4/1976 | Crisafulli | 210/923 |
| 4,033,876 | 7/1977 | Cocjin et al. | 210/923 |
| 4,057,498 | 11/1977 | Vidalles | 210/923 |

Primary Examiner—Stanley Silverman
Assistant Examiner—Christopher Upton
Attorney, Agent, or Firm—Harry M. Weiss

[57] ABSTRACT

An oil skimming apparatus for use in skimming oil, or hydrocarbons, or pollutants, from the surface of water. The apparatus includes a boat subassembly having left and right pontoons and a deck, an adjustable primary skimming wing portion suspended from the deck by hydraulic cylinders; a channel subassembly having a plurality of channels mounted on the top of the wing portion, a plurality of secondary skimming units respectively disposed at the outlet ends of the channels, and an oil collector and separator and storage subassembly.

12 Claims, 7 Drawing Sheets fig.1 fig.2 fig. 7 fig. 8 fig. 9 fig. 10 fig. 11 fig. 12 fig. 14 fig. 13 fig. 15 fig. 16 fig. 17

OIL SKIMMING APPARATUS AND METHOD

BACKGROUND OF THE INVENTION

1. Field of Invention

The invention generally relates to an oil skimming apparatus and method, and, in particular, the invention relates to an oil skimming apparatus and method having a high speed boat subassembly and having a primary skimming wing subassembly and having a plurality of secondary skimming units.

2. Background of the Invention

One prior art oil skimming apparatus is described in U.S. Pat. No. 4,257,889; issued Mar. 24, 1981. Related patents include U.S. Pat. Nos.

| |
|---|
| 3,664,505, issued May 23, 1972 |
| 3,703,463, issued November 21, 1972 |
| 3,822,789, issued July 09, 1974 |
| 4,057,498, issued November 08, 1977 |
| 4,111,811, issued September 05, 1978 |
| 4,151,081, issued April 24, 1979 |
| 4,304,668, issued December 08, 1981 |
| 4,623,459, issued November 18, 1986 |

The prior art oil skimming apparatus disclosed in U.S. Pat. No. 4,257,889 includes a ship subassembly, a first tank subassembly having an inlet opening with a flap and having an exit ramp and having an exit opening with an overflow flap, and a second collection tank subassembly.

One problem with this prior art oil skimming apparatus is that it is not suitable for relatively small, high speed boats. Another problem is that it is difficult to minimize the volume of excess water to be processed.

SUMMARY OF THE INVENTION

According to the present invention, an oil skimming apparatus is provided. This apparatus comprises a boat subassembly, an adjustable primary skimming wing subassembly, a channel subassembly, a plurality of adjustable secondary skimming units, and an oil collector subassembly.

By using the primary skimming wing subassembly and the channel subassembly, the apparatus is suitable for a relatively small, high speed boat as well as larger vessels. By using the primary skimming wing subassembly and the secondary skimming units, waves are flattened and the volume of excess water to be processed is minimized.

The foregoing and other objects, features and advantages will be apparent from the following description of the preferred embodiment of the invention as illustrated in the accompanying drawings.

DESCRIPTION OF THE PREFERRED EMBODIMENT

As shown in FIGS. 1, 2, 3 and 4, an apparatus 10 is used for skimming oil, or hydrocarbons, or other pollutants, from the surface of water. In plan view, apparatus 10 is symmetrical about a centerline 12. Apparatus 10 includes a boat subassembly or vessel 14, an adjustable, primary skimming wing subassembly 16, a channel subassembly 18 for guiding skimmed water with oil in streams, a plurality of respective, adjustable, secondary skimming units or stream separators 20, 22, 24, and an oil collector subassembly 26.

Boat subassembly 14 has a left pontoon 28 which has a propeller 27 and a rudder 29, and has a right pontoon 30, which has a propeller 31 and rudder 33. Boat subassembly 14 also has a deck or deck plate 32, which is fixedly connected to pontoons 28, 30, and which has a suitable top surface 34. Boat subassembly 14 also has a plurality of connectors 36, 38, 40, 42. Typical connector 40 (FIG. 4), which is identical to connectors 36, 38, 42 is a shock-absorbing, hydraulic unit. Typical connector 40 has a cylinder 44, which has a hinge 46 that is connected to deck 32; and has a piston 48, which has a hinge 50 that is connected to wing subassembly 16. Hinge 50 has a T-slot guide 52, which is connected to pontoon 30.

Wing subassembly 16, which can be raised or lowered or tilted relative to pontoon 28, 30 and deck 32, has an airfoil-shaped or wing or airfoil portion 54, which has a leading edge 55. Wing subassembly 16 also has a left projection plate 56 and a right projection plate 58, for picking up or skimming a selective width and a selective depth 60 of water 62 which then flows in a direction 64. Depth 60 is set by connectors 36, 38, 40, 42 to suit water turbulence and water flow rate. Airfoil portion 54 also is suited to high speed water flow across its profile and surface.

As shown in FIGS. 5, 6, 7 and 8, channel subassembly 18 has a left channel 66, which has left sidewall 68 and right sidewall to (FIG. 5); and has a center channel 72, which has left and right sidewalls 74, 76; and has a right channel 78, which has left and right sidewalls 80, 82. Channels 66, 72, 78 have respective rear bottom plates 84, 86, 88. Typical center channel 72, which is identical to channels 66, 78, has varying profiles or shapes 90, 92, 94, 96 (FIG. 6) which are located at a series of sections. Shapes 90, 92, 94, 96 have about the same cross-sectional area.

Figure 9:
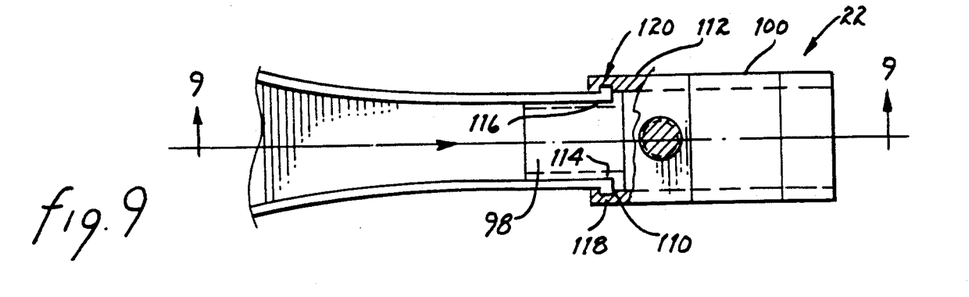
FIG. 9 is an enlarged view of a portion of FIG. 3.
Figure 10:
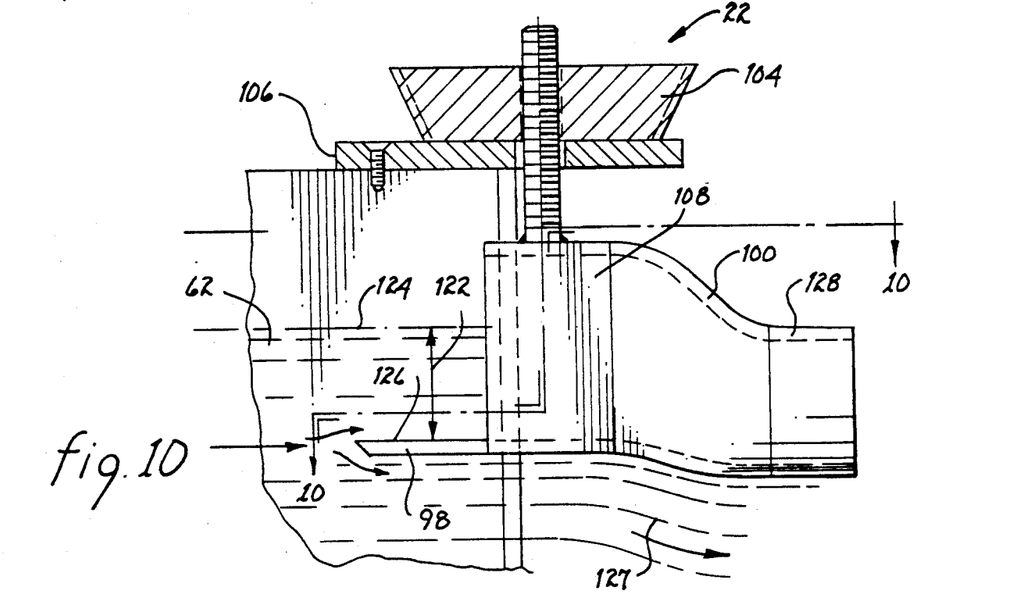
FIG. 10 is a section view as taken along line 10—10 of FIG. 9.
Figure 11:
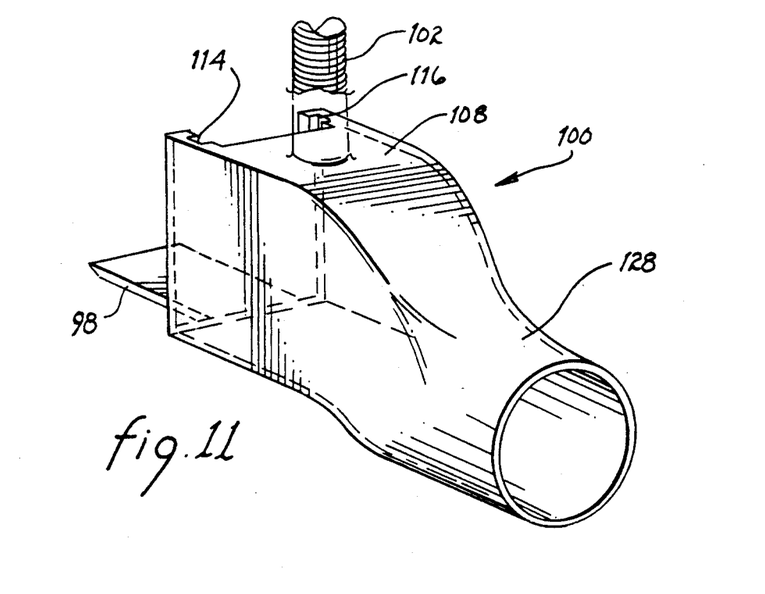
FIG. 11 is a perspective view of a portion of FIG. 9.

As shown in FIGS. 9, 10 and 11, typical center skimmer unit 22, which is identical to skimmer units 20, 24, has a skimmer plate 98. Unit 22 also has a faired pipe unit 100, which has a threaded support rod or bolt 102, that has an adjustment nut 104. Unit 22 also has a support plate 106, which is fixedly connected to adjacent sidewalls 74, 76, and which supports nut 104 and bolt 102.

Faired pipe unit 100 has a rectangle-section portion 108, which has front and back, opposite wall portions 110, 112, that have respective slots 114, 116. Slots 114, 116 receive respective lips 118, 120 of sidewalls 74, 76. Lips 118, 120 allow vertical adjustment, by turning nut 104, of faired pipe 100 and skimmer plate 98 relative to support plate 106 and sidewalls 74, 76. Such adjustment sets a selective dimension 122, which is between surface 124 of water 62 and skimmer plate surface 126. Excess water 127 passes under skimmer plate 98 and pipe 100. Pipe 100 has a round-section portion 128, which connects to collector subassembly 26.

Collector subassembly 26 (FIG. 3) has a storage drum 130, a valve 132, a connecting pipe 134, a separator 136, a connecting pipe 138, a pump 140 and a manifold 142, all of which are connected in series. Skimmer units 20, 22, 24 have respective flexible hoses 144, 146, 148, which connect to manifold 142.

The material of deck 32, pontoons 28, 30, skimmer plates 98 and skimmer pipe 100 is metal plate. The material of the exterior of wing portion 54 and channel sidewalls 68, 70, 74, 76, 80, 82 is metal sheet; and metal material or wood material or plastic material is used in the interior thereof.

In summary, the purpose of this invention is the removal and concentration of floating pollutants, particularly oil and other hydrocarbons, from the surface of a body of water 62. The invention is a self-propelled floating vessel 14, designed to operate at relatively high speeds and in turbulent as well as calm water. The net result is the rapid clearing of large surface areas of water, enabling the cleanup of pollutants from even massive spills. A secondary benefit is the recovery of petroleum products that would otherwise be lost. This process i accomplished by two unique features comprising the wing subassembly 16 and channel system 18, to be subsequently described.

The vessel is a fast moving boat 14 formed by two large pontoons 28, 30 rigidly fixed together. The vessel is equipped with engines which power propellers 27, 31 situated at the rear ends of the pontoons. Situated between the pontoons is a large wing portion 54 extending from slightly in front of the pontoons to the rear of the vessel. The cross-sectional shape of the wing 54, is somewhat analogous to that of an airplane wing. The front and rear ends of the wing are adjustable up or down by hydraulic control to accommodate differences in surface water conditions and speed of the vessel. The angle of the wing 54 can thus be altered to correct for differences in the angle of the boat relative to the surface of the water. By this method the wing 54 can be maintained uniformly flat, slightly submerged, with its bottom parallel to the surface of the water. As the hydraulic cylinder 40 moves up or down, it is stabilized by a vertical "T"-shaped slot 52 attached to the pontoon, into which the lower end of the hydraulic cylinder is fitted.

The wing 54 is designed to accomplish two functions: First, to lift a broad sheet of water and, second, to dissipate the kinetic energy of waves. The thickness of the wing 54 at its highest point is determined based on the speed capabilities desired and the degree of turbulence in which the vessel 14 is designed to function. The thickest point of the wing must be at least as high above the water surface as the highest waves encountered. The incline of the front portion of the wing is gradual, allowing for the gentle lifting of the surface layer of water while maintaining the pollutant confined to the surface without emulsification. Lateral extensions 56, 58 extend forward from the front sides of the wing 54 preventing lateral displacement of water as it is lifted up. As the vessel 14 moves forward with the bottom of the wing 54 slightly submerged, a relatively uniform waveless stream is thicker at the bottom and relatively thin and smooth as it passes over the thickest portion of the wing 54.

The broad stream of water then encounters a series of one or more funnel-shaped channels 66, 72, 78. The purpose of these channels is the gradual narrowing of the surface of the water containing the pollutant, thus concentrating the pollutant. Down the length of each channel, the stream of water is gradually changed in shape from an initial broad horizontal sheet to a funnel-shaped stream with a narrow surface. At the rear of each channel, an upper, relatively small stream containing the pollutant is abruptly separated from the much more voluminous lower stream by a sharp plate 98. The level of this plate is adjustable up or down. The shape of the channels is such that the cross sectional areas (90, 92, 94, 96) at all levels along the length of the channels are identical, despite gradual changes in cross sectional shape. Thus, the flow rate is uniform and the water surface remains level. At the rear of the channels, the bottom levels out so that the excess water is expelled above the level of the outside body of water. As the vessel 14 travels at rapid speeds, the volume of the water-pollutant generated at the ends of the channels is sufficiently small to permit continuous pumping, separation of the pollutant from the water, and discarding of the excess water at the same rate that the pollutant is collected. The cross sectional shape of each channel at the rear is that of a funnel, with parallel sides at the top. The lateral aspects of the top parallel sides are equipped with vertically oriented lips 118, 120 to accommodate each of the stream separators 20, 22, 24.

Each stream separator is equipped with vertical slots 114, 116 which fit into the lips of the top rear ends of the channels. A sharp plate 98 extends forward, separating the upper stream (containing the pollutant) from the larger lower stream. The rear end of each separator gradually changes shape from rectangular to round. A flexible pipe is attached to the rear end of the separator. The flexible pipes 144, 146, 148 from each of the separators are directed to the deck 32 of the vessel 14 where they attach to a suction manifold 142 which is in turn connected to a pump 140. The separators are each adjustable up or down by the provision of a threaded rod 102 fixed to the superior aspect of the separator. The top end of this rod is threaded through a plate 106 which is attached to the top rear of the channels.

Vessel 14 pan has additional empty storage drums. After drum 130 is filled, it is dumped overboard for later pickup by a barge. An empty tank is then connected to separator 136.

Figures 12, 13, 14:
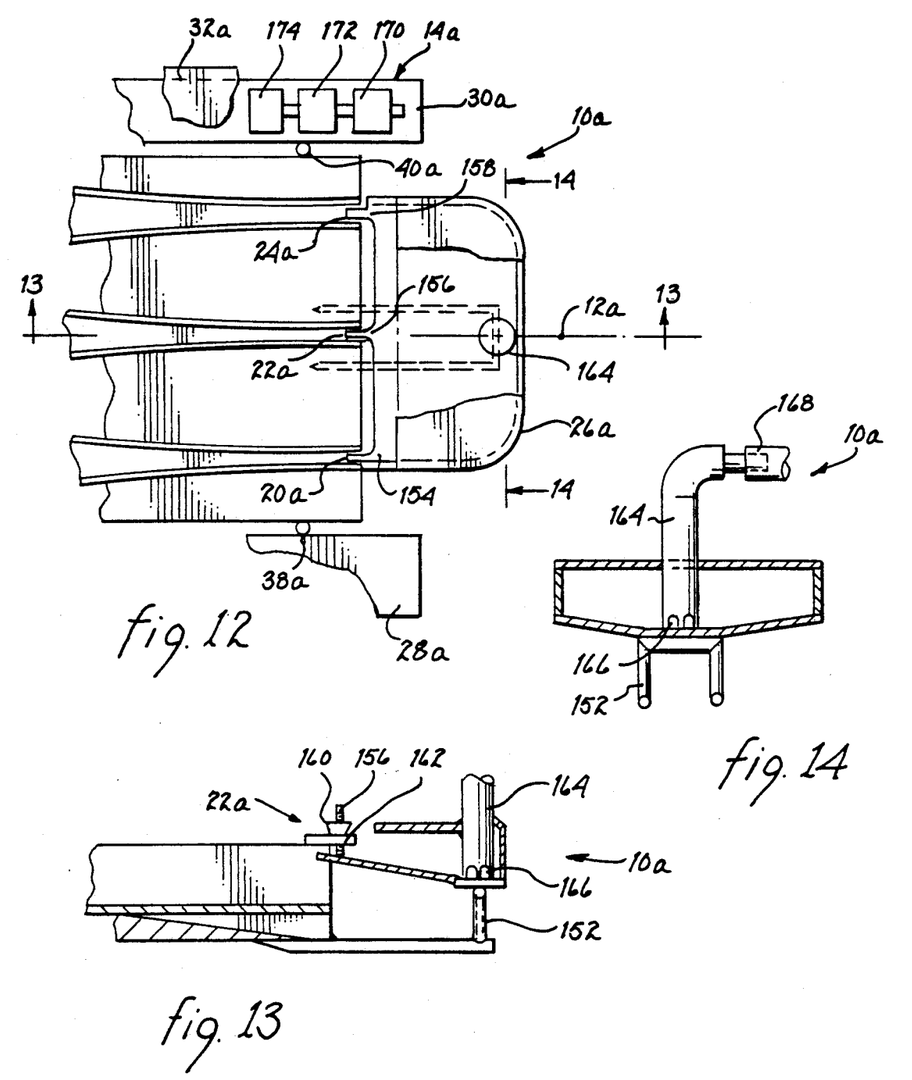
FIG. 12 is a plan view of a second embodiment according to the invention.
FIG. 13 is a section view as taken along line 13—13 of FIG. 12.
FIG. 14 is a section view as taken along line 14—14 of FIG. 12.

As shown in FIGS. 12, 13 and 14, a second embodiment or apparatus 10a is provided. Parts of second embodiment 10a, which are the same as corresponding parts of first embodiment 10, have the same numerals but with a subscript "a" added thereto.

Apparatus 10a has a centerline 12a in plan view. Apparatus 10a includes a boat subassembly 14a, which has pontoons 28a, 30a that have connectors 38a, 42a and a deck 32a. Apparatus 10a also has a wing subassembly 16a, which is supported by connectors 38a, 42a, and has a channel subassembly 18a. Apparatus 10a also has skimmer units 20a, 22a, 24a, and has a collector subassembly 26a.

Collector subassembly 26a has a holding tank 150, which is supported by a pipe support 152 and by adjustment bolts 154, 156, 158. Typical center bolt 156, which is identical to bolts 154, 158, has an adjustment nut 160 and a support plate 162. Plate is fixedly connected to channel subassembly 18a. Tank 150 has a suction pipe 164, which has cutouts or fenestrations 166. Pipe 164 has a flexible hose 168, which connects to pump 170 and separator 172 and storage drum 174.

Figure 1:
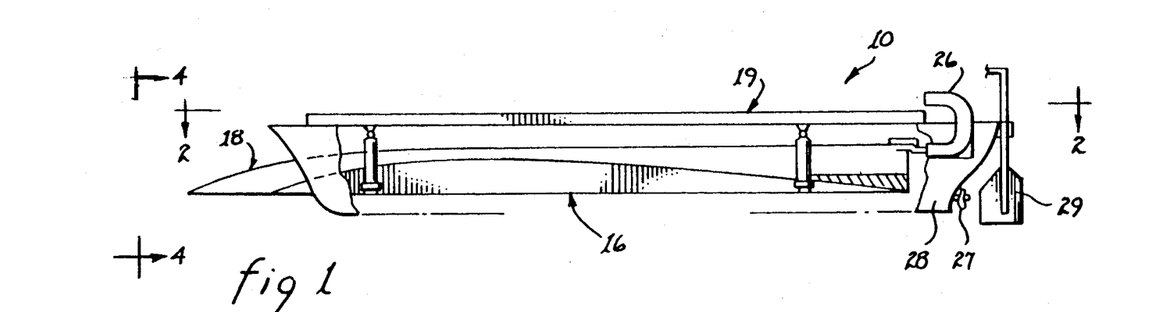
FIG. 1 is a partly cutaway, elevation view of an oil skimming apparatus according to the invention.
Figure 2:
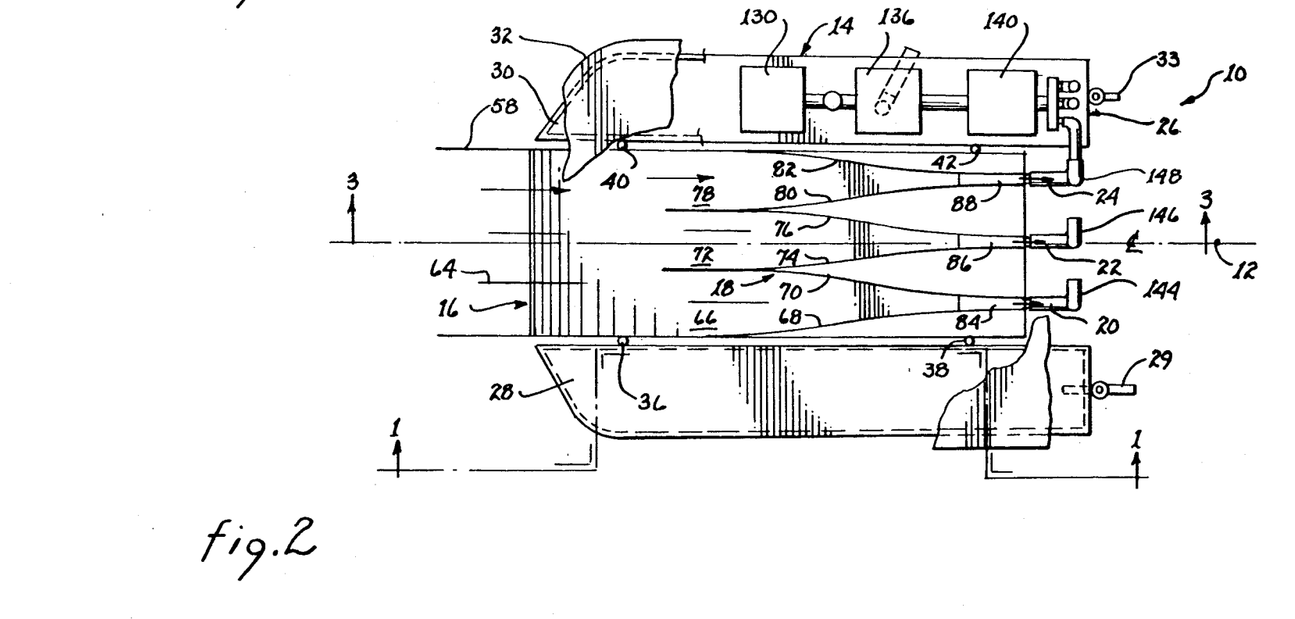
FIG. 2 is a plan view as taken along line 2—2 of FIG. 1.
Figure 3:
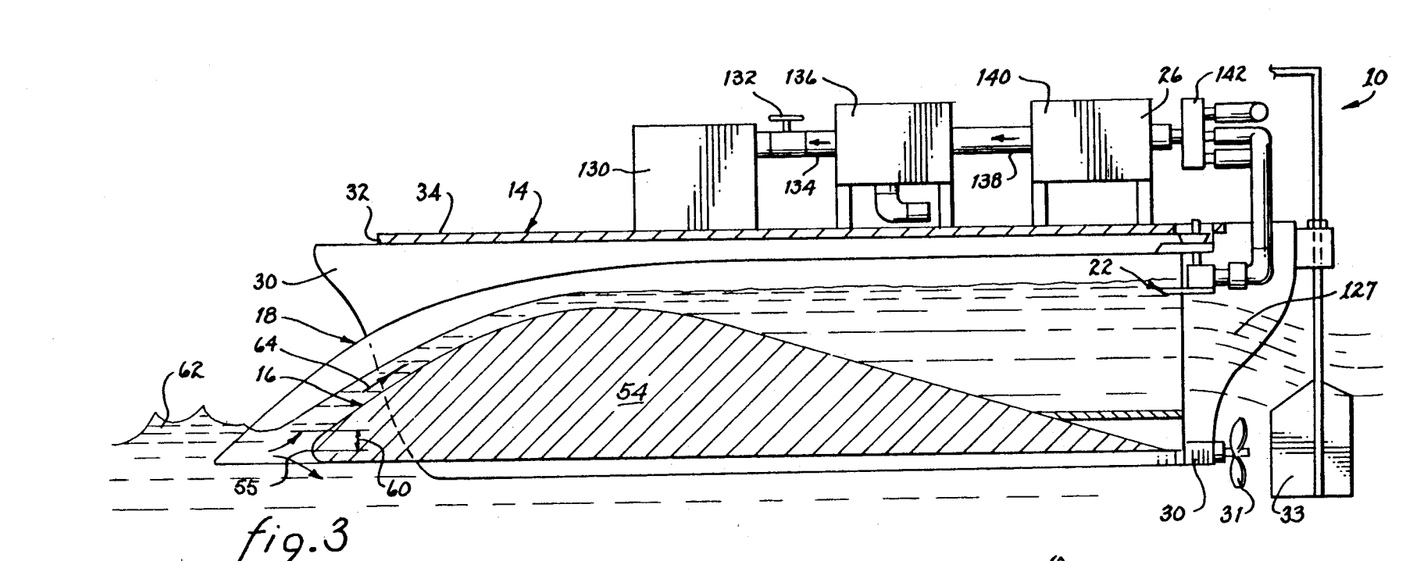
FIG. 3 is a section view as taken along line 3—3 of FIG. 2.
Figure 4:
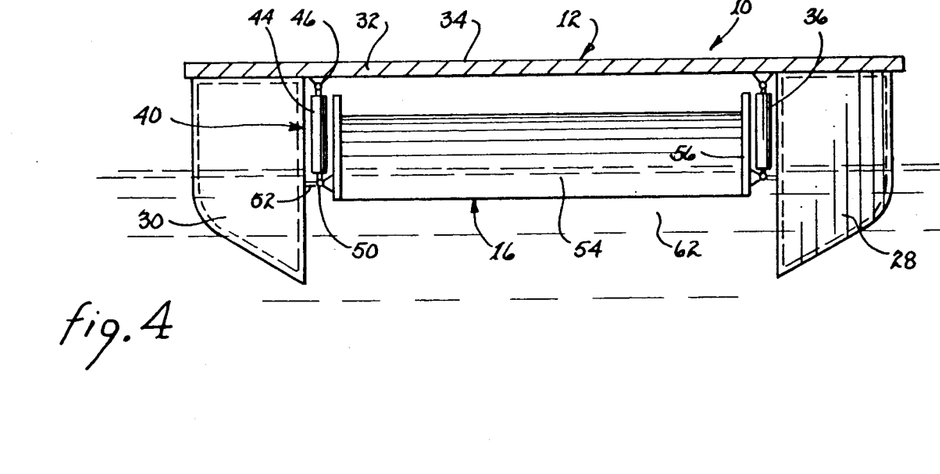
FIG. 4 is a section view as taken along line 4—4 of FIG. 1.
Figures 5, 6:
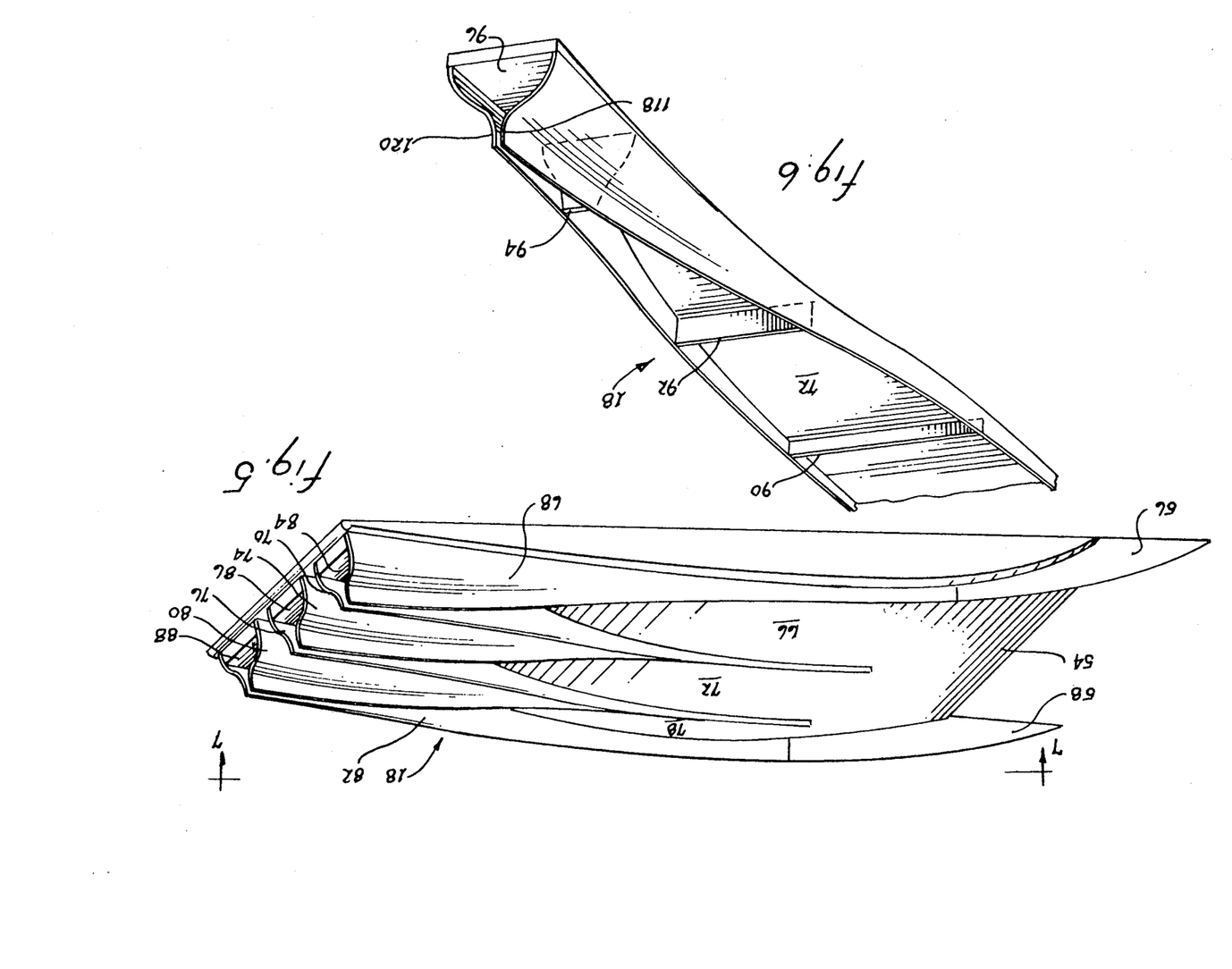
FIG. 5 is a perspective view of a portion of FIG. 2.
FIG. 6 is a perspective view of a portion of FIG. 5.
Figure 7:
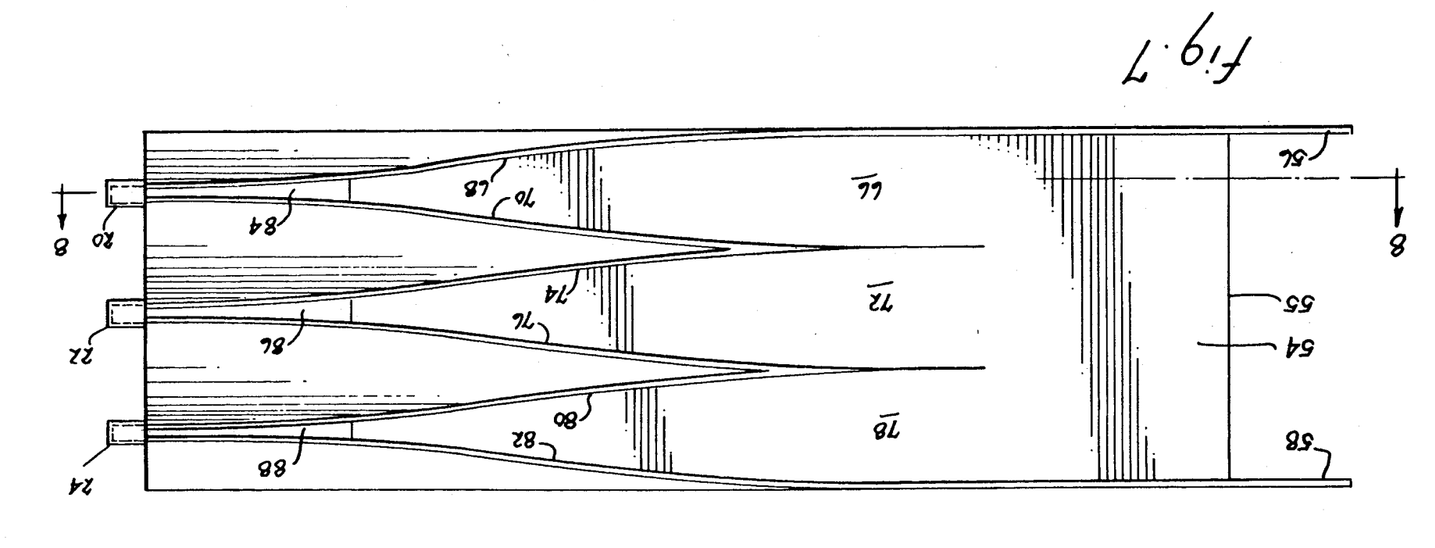
FIG. 7 is a plan view as taken along line 7—7 of FIG. 5.
Figure 8:
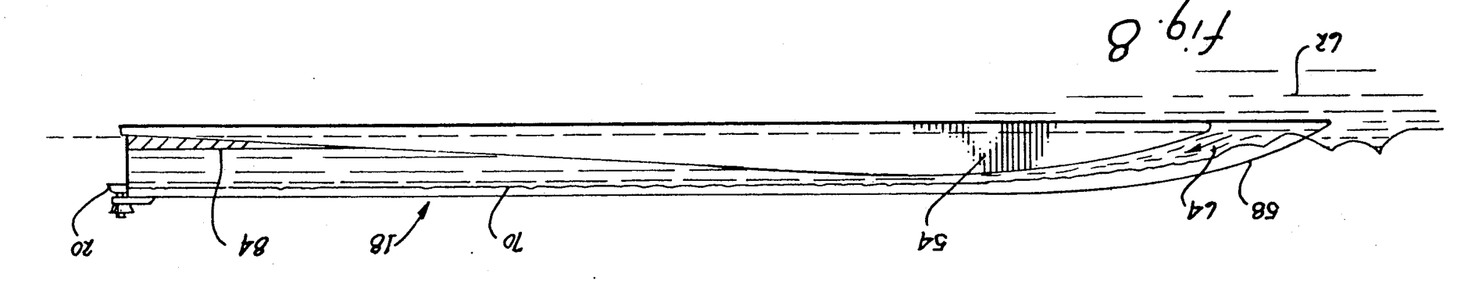
FIG. 8 is a section view as taken along line 8—8 of FIG. 7.
Figure 15:
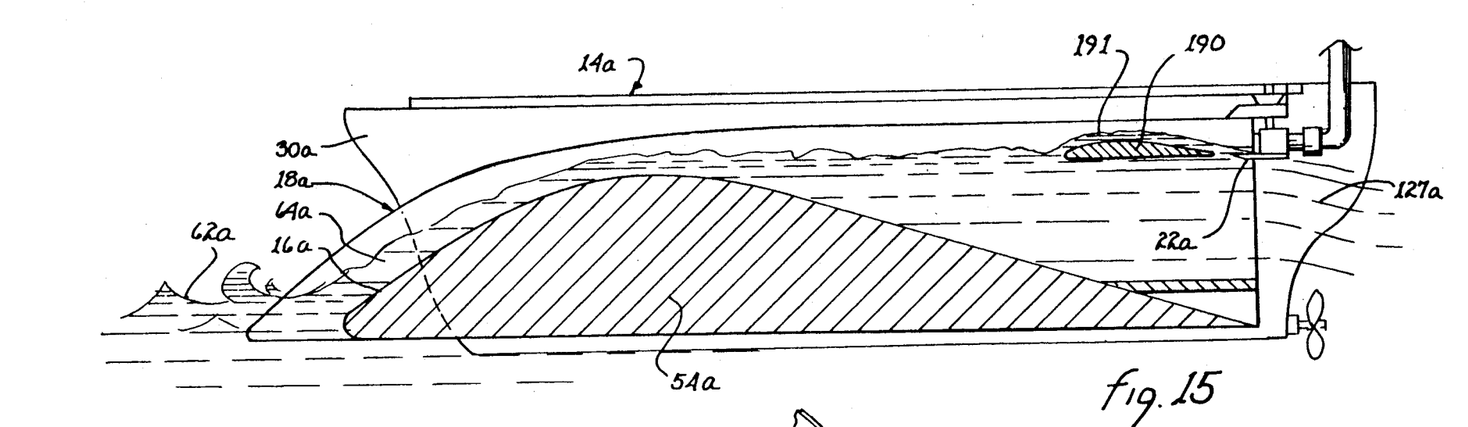
FIG. 15 is a view similar to FIG. 3, but depicts another embodiment using a smaller wing.
Figure 16:
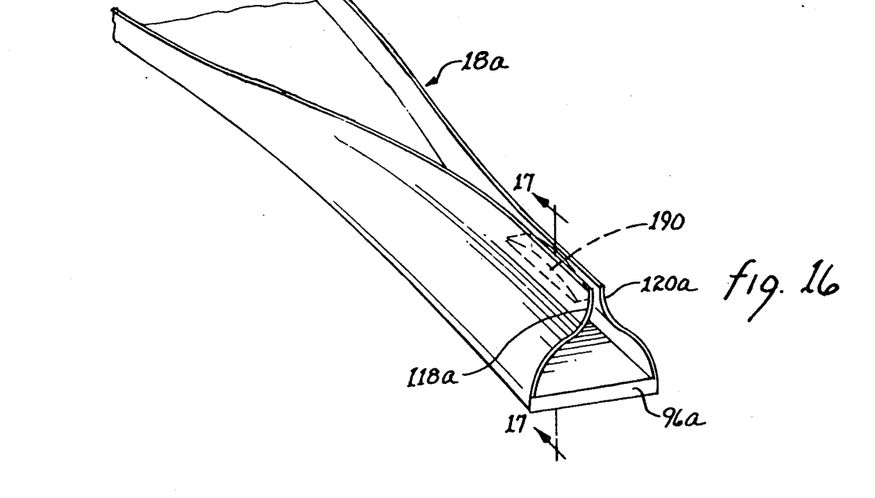
FIG. 16 is a view similar to FIG. 6 with the smaller wing of FIG. 15.
Figure 17:
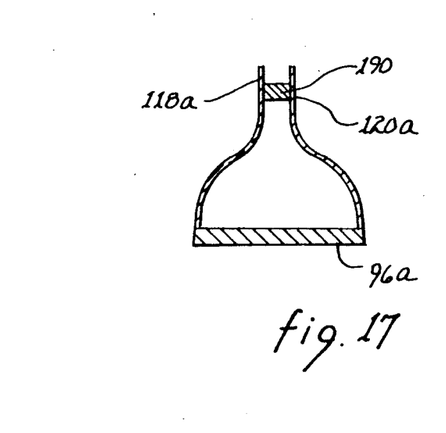
FIG. 17 is a section view as taken along line 17—17 of FIG. 16.

FIG. 15, 16 and 17 depict another embodiment of the invention and illustrate similar views as disclosed in FIGS. 3 and 6. The addition of the letter a to the figure numbers of FIGS. 3 and 6 for FIGS. 15, 16 and 17 serve to indicate the corresponding elements of FIGS. 15, 16 and 17 that correspond to the same elements in FIG. 3 and 6. A new feature of FIGS. 15, 16 and 17 is the use of a smaller wing 190 which is a vertically adjustable smaller wing that is located at the rear end portion of each channel. As can be seen with reference to FIG. 15, the smaller, vertically adjustable wing 190 is preferably below water level 191 thereby making the bottom surface portion of the wing 190 slightly submerged. The function and purpose of the use of the smaller wing 190 in each channel is to dissipate or reduce the turbulence of the water as it flows down or through each of the channels.

Therefore, in rough seas, swells and subsequent rocking of the vessel or boat will usually cause some variations in the volume of water which is lifted by the leading edge of the large wing. The flow of this excess water up the wing and through the channels will be counteracted by gravity and by the funnel shapes of the channel surfaces. However, any increased volume of water which passes through the channels will generally cause fluctuations in the level of water as it approaches the stream separators. Therefore, the use of each of the smaller wings 190 at the rear end of each of the channels will keep or maintain the water level relatively constant as it exits the channels, thus further minimizing excess water collected by the apparatus.

While the invention has been described in its preferred embodiment, it is to be understood that the words which have been used are words of description rather than limitation and that changes may be made within the purview of the appended claims without departing from the true scope and spirit of the invention in its broader aspects. The term oil, as used in the patent claims, is intended to cover oil, hydrocarbons, and/or other pollutants.

The embodiments of an invention in which an exclusive property or right is claimed are defined as follows:

I claim:

1. Skimming apparatus for skimming oil off water comprising:
   a boat subassembly;
   a single primary skimming wing subassembly adjustably connected to said boat;
   a channel subassembly dividing said wing into a plurality of channels;
   a plurality of secondary skimming units respectively disposed at outlet ends of the channels; and
   oil collector subassembly means connected to said secondary skimming units for collecting and storing the oil.

2. The apparatus of claim 1, wherein the boat subassembly includes:
   a left pontoon;
   a right pontoon;
   a deck fixedly connected to the pontoons; and
   a plurality of adjustable connectors supporting the wing subassembly for setting the submerged depth and tilt angle of the wing subassembly.

3. The apparatus of claim 2, wherein each adjustable connector includes:
   a hydraulic cylinder having a hinge connected to the deck;
   a piston received in the cylinder and having a hinge connected to the wing subassembly; and
   guide means having a first portion connected to the pontoon adjacent thereto and having a second portion connected to the piston.

4. The apparatus of claim 1, wherein each channel includes:
   a left sidewall;
   a right sidewall;
   the left and right sidewalls having a width therebetween which gradually decreases and having a depth which gradually increases and having a sectional transverse area which is approximately the same in size as the channel approaches its secondary skimming unit.

5. The apparatus of claim 1, wherein the wing subassembly includes:
   an airfoil-shaped wing portion adjustably supported by the boat subassembly and having a leading edge for primary skimming of the water and having a top surface for mounting the channel subassembly;
   the wing portion having a left projection and having a right projection for skimming a selective width of the water in front of its leading edge; and
   the wing portion being adjustable in submergence depth along its leading edge and in tilt angle for skimming a selected projected area of water.

6. The apparatus of claim 1, wherein each secondary skimmer unit includes:
   a faired pipe unit having a skimmer plate at an inlet end extending into its respective channel and having a round pipe portion at its outlet end for connection to a flexible hose which connects to the collector subassembly; and
   the faired pipe unit having an adjustment bolt and nut with a support plate fixedly connected to the channel subassembly for adjusting a submergence depth of the skimmer plate.

7. The apparatus of claim 1, wherein the collector subassembly includes a storage drum, a valve, a pipe, a separator a pipe, a pump, and a manifold, all connected in series; and includes respective flexible hoses from the manifold to the secondary skimmer units.

8. The apparatus of claim 1, wherein the collector subassembly includes a holding tank fixedly connected to the secondary skimmer units, the tank being adjustably supported for setting the submergence depth of the skimmer units; and includes a storage drum, a valve, a pipe, a separator, a pipe, and a pump, all connected in series; and includes a flexible hose connected at one end to the holding tank and connected at an opposite end to the pump.

9. The apparatus of claim including small wing means located in end portions of each of said plurality of channels for reducing the turbulence of the water flowing through said channels.

10. The apparatus of claim 9 wherein said small wing means are vertically adjustable.

11. An oil skimming apparatus comprising:
   a boat subassembly having left and right pontoons and having a deck fixedly connected to the pontoons;
   a single adjustable primary skimming wing portion suspended from the deck by hydraulic cylinders;
   a channel subassembly dividing said wing into a plurality of channels mounted on a top surface of the wing portion;
   a plurality of secondary skimming units respectively disposed at outlet ends of each of the channels; and
   an oil collector and separator and storage subassembly connected to the secondary skimming units.

12. A method of skimming oil from the surface of water including:
   skimming a selective width and depth of water with oil with a single primary skimming wing;
   channeling the skimmed water with oil into a plurality of gradually narrowing streams;
   skimming a selective depth of the water with oil from each stream;
   emptying the excess water from each stream;
   pumping the twice skimmed water with oil through a separator;
   emptying the separated water; and
   filling a storage container with the oil.

* * * * *

UNITED STATES PATENT AND TRADEMARK OFFICE
CERTIFICATE OF CORRECTION

PATENT NO. : 5,019,277
DATED : May 28, 1991
INVENTOR(S) : Andelin

It is certified that error appears in the above-identified patent and that said Letters Patent is hereby corrected as shown below:

Column 7:
  Claim 9, line 1, after "claim" insert --1--

Signed and Sealed this

Thirteenth Day of April, 1993

Attest:

STEPHEN G. KUNIN

*Attesting Officer*  *Acting Commissioner of Patents and Trademarks*